United States Patent [19]

Brue et al.

[11] Patent Number: 5,267,106
[45] Date of Patent: Nov. 30, 1993

[54] SYSTEM FOR CLAMPING A PLURALITY OF DISKS TO A HUB

[75] Inventors: Boyd M. Brue, Rochester; Pete M. Herman, Oronoco; Jerry L. Neubauer, Stewartville; Steven H. Voss, Rochester, all of Minn.

[73] Assignee: International Business Machines Corporation, Armonk, N.Y.

[21] Appl. No.: 893,271

[22] Filed: Jun. 4, 1992

[51] Int. Cl.[5] ............................................. G11B 17/02
[52] U.S. Cl. ................................................ 360/98.08
[58] Field of Search ................. 360/98.07, 98.08, 135

[56] References Cited

U.S. PATENT DOCUMENTS

| | | | |
|---|---|---|---|
| 3,034,795 | 5/1962 | Guest . | |
| 4,672,488 | 6/1987 | Wright . | |
| 4,754,351 | 6/1988 | Wright | 360/98.08 |
| 4,754,447 | 6/1988 | VanSant . | |
| 4,764,828 | 8/1988 | Gollbach | 360/98.08 |
| 4,775,906 | 10/1988 | Suzuki et al. | 360/98.08 |
| 4,819,105 | 4/1989 | Edwards . | |
| 4,918,545 | 4/1990 | Scheffel . | |
| 5,006,942 | 4/1991 | Brooks et al. | 360/98.08 |
| 5,012,380 | 4/1991 | Harissis et al. | 360/135 |
| 5,089,922 | 2/1992 | Leclair | 360/98.08 |
| 5,136,450 | 8/1992 | Moir | 360/98.08 |
| 5,150,512 | 9/1992 | Hatchett et al. | 360/98.08 |

*Primary Examiner*—John T. Kwon
*Attorney, Agent, or Firm*—Lisa L. B. Yociss; Andrew J. Dillon

[57] ABSTRACT

A system is disclosed for clamping disks in a spaced parallel relationship around a circular hub in a disk drive storage system. An annular clamp is provided which includes tabs extending inwardly into the aperture of the annular clamp which define a slightly smaller aperture. When a collapsing force is applied to the annular clamp, these tabs are displaced outwardly such that the annular clamp may be placed over the circular hub. The circular hub includes a lip for receiving the tabs and prohibiting axial movement of the annular clamp in response to a release of the collapsing force. Annular spacers are also disposed around the circular hub between adjacent disks. In a preferred embodiment of the present invention, each annular spacer includes multiple pads on each side thereof, minimizing any disk distortion which may be caused by spacer size variations.

14 Claims, 3 Drawing Sheets

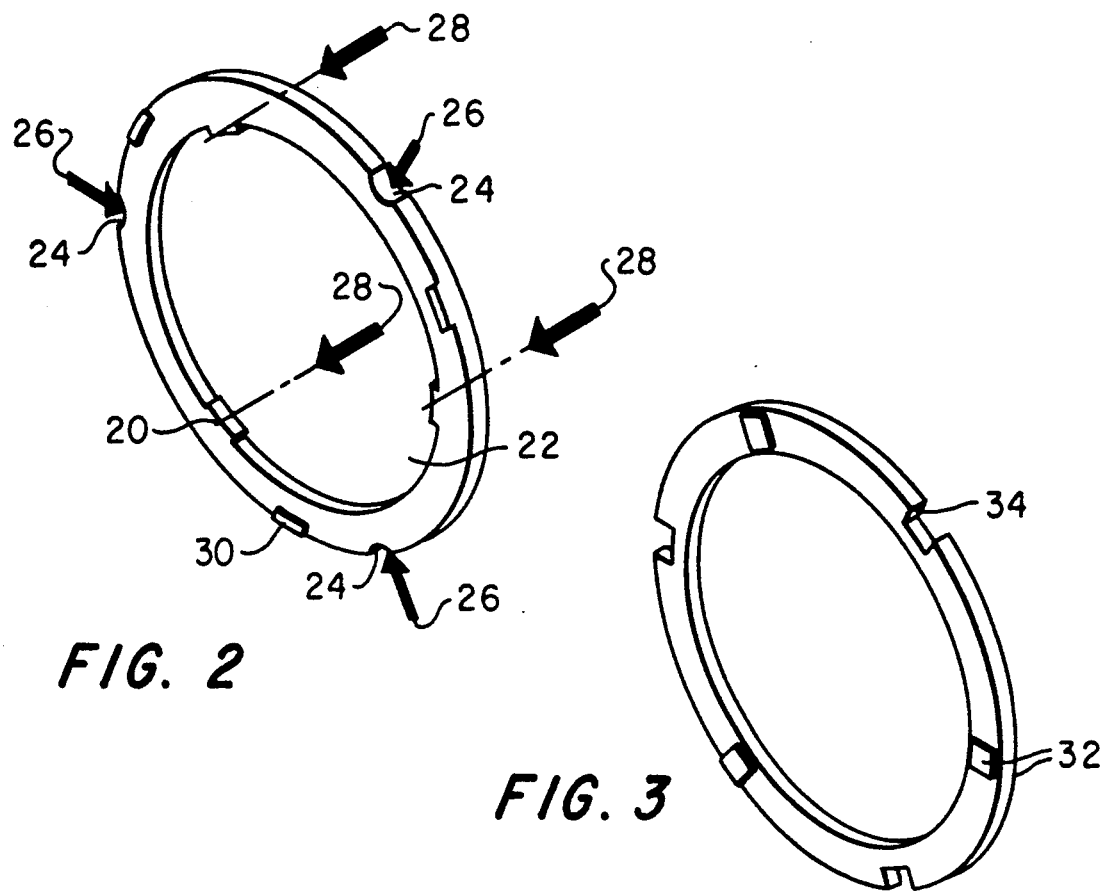
FIG. 2
FIG. 3
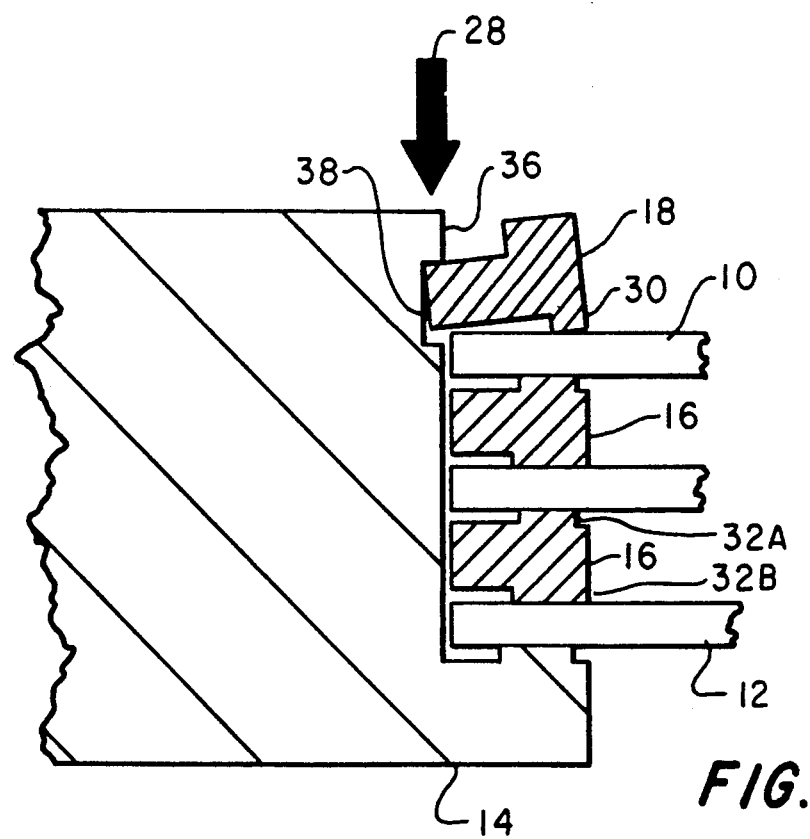
FIG. 4

1

SYSTEM FOR CLAMPING A PLURALITY OF DISKS TO A HUB

BACKGROUND OF THE INVENTION

1. Technical Field

The present invention relates in general to the field of computer disk drive storage systems and in particular to devices for clamping a plurality of disks around a circular hub. Still more particularly, the present invention relates to a device for providing an annular clamp having tabs to be received by a lip within the circumference of a circular hub in a disk drive storage system and providing a plurality of annular spacers for clamping a plurality of disks around the circular hub.

2. Description of the Related Art

Disk drive storage systems utilized in data processing systems often include multiple disks spaced in a parallel relationship clamped to a hub. It is well known in the art to shrink a ring around the hub holding the disks in place in a disk drive storage system utilizing friction forces. However, during assembly and disassembly, such shrink rings slide across the disk causing disk cupping. Shrink rings also apply radial forces to the hub as the rings contract, causing spindle bearing deformation. Other known assemblies for clamping disks to a hub without a disk drive storage system include screw on clamps which require more process time for assembly and give inconsistent clamp loads.

Disk distortion is also becoming a significant problem. Such distortion may be caused by bad disks, bad spacers placed between adjacent disks, or both. In the prior art, disk spacers have generally been a solid ring design which contacts the adjacent disks with the entire surface of the spacer. To reduce disk distortion caused by the spacers, an expensive solution has been to produce spacers with extremely small flatness tolerances.

Therefore, a need exists for a system for efficiently clamping a plurality of disks to a circular hub for applying axial clamping to adjacent disks while imparting small radial forces.

SUMMARY OF THE INVENTION

It is therefore one object of the present invention to provide an improved disk drive storage system.

It is another object of the present invention to provide an improved system for clamping a plurality of disks around a circular hub within a disk drive storage system.

It is yet another object of the present invention to provide an improved system for clamping a plurality of disks around a circular hub within a disk drive storage system includes an annular clamp having tabs designed to be received by a lip within the circumference of a circular hub and which includes a plurality of annular spacers for clamping a plurality of disks around the circular hub.

The foregoing objects are achieved as is now described. A system is disclosed for clamping disks in a spaced parallel relationship around a circular hub in a disk drive storage system. An annular clamp is provided which includes tabs extending inwardly into the aperture of the annular clamp which define a slightly smaller aperture. When a collapsing force is applied to the annular clamp, these tabs are displaced outwardly such that the annular clamp may be placed over the circular hub. The circular hub includes a lip for receiving the tabs and prohibiting axial movement of the annular clamp in response to a release of the collapsing force. Annular spacers are also disposed around the circular hub between adjacent disks. In a preferred embodiment of the present invention, each annular spacer includes multiple pads on each side thereof, minimizing any disk distortion which may be caused by spacer size variations.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a perspective view of an annular clamp in accordance with the present invention.

FIG. 3 is a perspective view of an annular spacer in accordance with the present invention.

FIG. 4 is a fragmentary vertical sectional view of an annular clamp, plurality of annular spacers, plurality of disks, and a circular hub.

DETAILED DESCRIPTION OF PREFERRED EMBODIMENT

Figure 1:
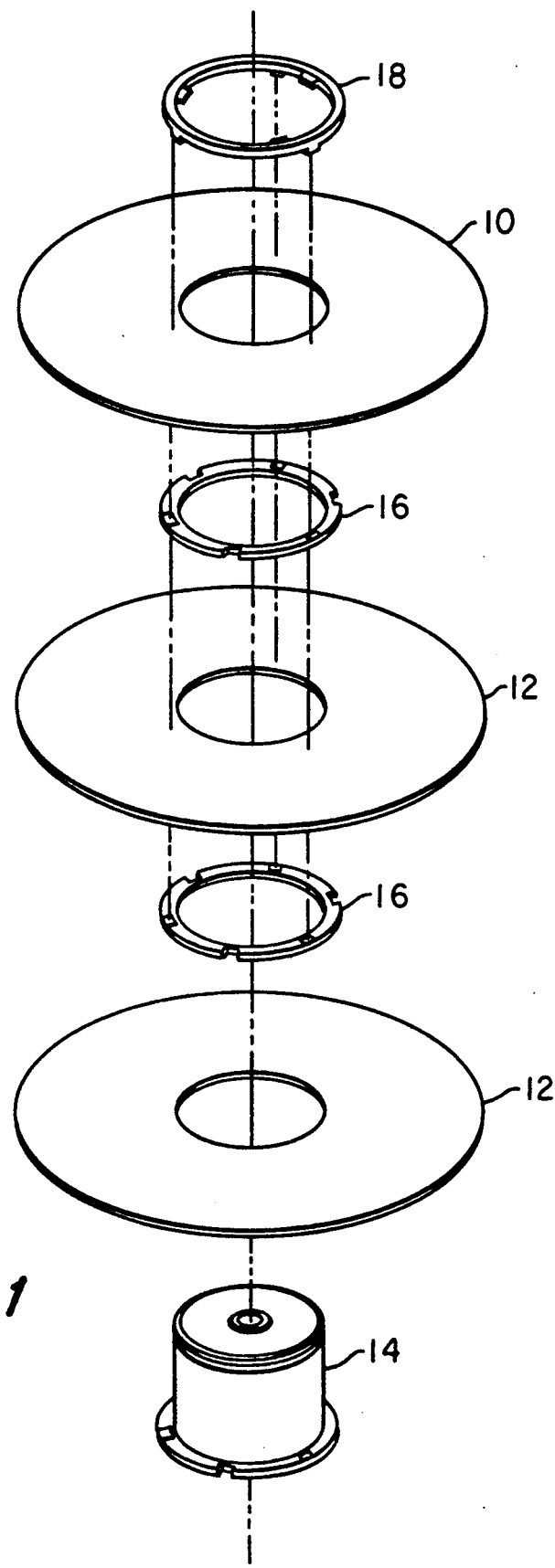
FIG. 1 is an exploded view of a system for efficiently clamping a plurality of disks in a spaced parallel relationship around a circular hub in accordance with the present invention.

With reference now to the figures and in particular with reference to FIG. 1, there is illustrated an exploded view of a system for efficiently clamping a top disk 10 and a plurality of disks 12 in a spaced parallel relationship around a circular hub 14 in accordance with the present invention. Adjacent disks are separated by annular spacers 16. Top disk 10, disks 12 and annular spacers 16 are clamped around circular hub 14 by annular clamp 18. Although annular clamp 18 and annular spacers 16 need not be formed from the same material, in a preferred embodiment, both are formed utilizing steel. As should be apparent to those skilled in the art, annular clamp 18 and annular spacers 16 may be formed utilizing aluminum or plastic.

Now referring to FIG. 2, there is illustrated a perspective view of annular clamp 18 in accordance with the present invention. Annular clamp 18 includes three tabs 20 extending inwardly into an aperture 22, and a plurality of indentations 24 circumferentially spaced around the outer edge of annular clamp 18. Tabs 20 define an aperture that is slightly smaller than the diameter of circular hub 14. When a collapsing force 26 is applied to indentations 24, tabs 20 are displaced outwardly allowing annular clamp 18 to be placed over circular hub 14 and an axial force 28 is applied. Three tabs 30 are disposed upon the lower surface of annular clamp 18 and contact top disk 10.

In this manner, annular clamp 18 is a one piece design with no screws which permits quick assembly and gives a more consistent clamp load. During assembly, tabs 30 rotate slightly instead of sliding across the surface of top disk 10 which has been a primary cause of disk cupping. This design permits assembly with no radial forces to top disk 10, disks 12 or circular hub 14.

With reference to FIG. 3, there is illustrated a perspective view of annular spacer 16 in accordance with the present invention. Annular spacer 16 includes three pads 32 on both the upper and lower surfaces. Known spacers have utilized large areas and a large number of pads on the surface of the spacer which has caused disk distortion due to the increased surface area contacting the disks. A plurality of indentations 34 are circumferentially spaced around the outer edge of annular spacer 16 and are utilized to rapidly align annular spacer 16 around circular hub 14.

Now referring to FIG. 4, there is illustrated a fragmentary vertical sectional view of annular clamp 18, annular spacers 16, top disk 10, disks 12, and circular hub 14. Top disk 10 and disks 12 are separated by annular spacers 16. Three pads 32 on each surface of annular spacers 16 contact top disk 10 and disks 12, thus reducing distortion and allowing a vented circular hub. A vented circular hub permits an improved air flow and therefore, a cleaner environment within the disk drive storage system.

To compensate for radial and concentric alignments, pads 32A on the upper side of annular spacer 16 are slightly larger than pads 32B on the lower side. Indentations 34, shown in FIG. 3, circumferentially spaced about the outer edge of annular spacer 16 are utilized to align annular spacers 16 around circular hub 14. Annular clamp 18 contacts top disk 10 by three tabs 30 applying axial clamping force 28. Tabs 20, shown in FIG. 2, are received by groove 38 and held in place by lip 28 thus prohibiting axial movement of annular clamp 18.

Figure 5:
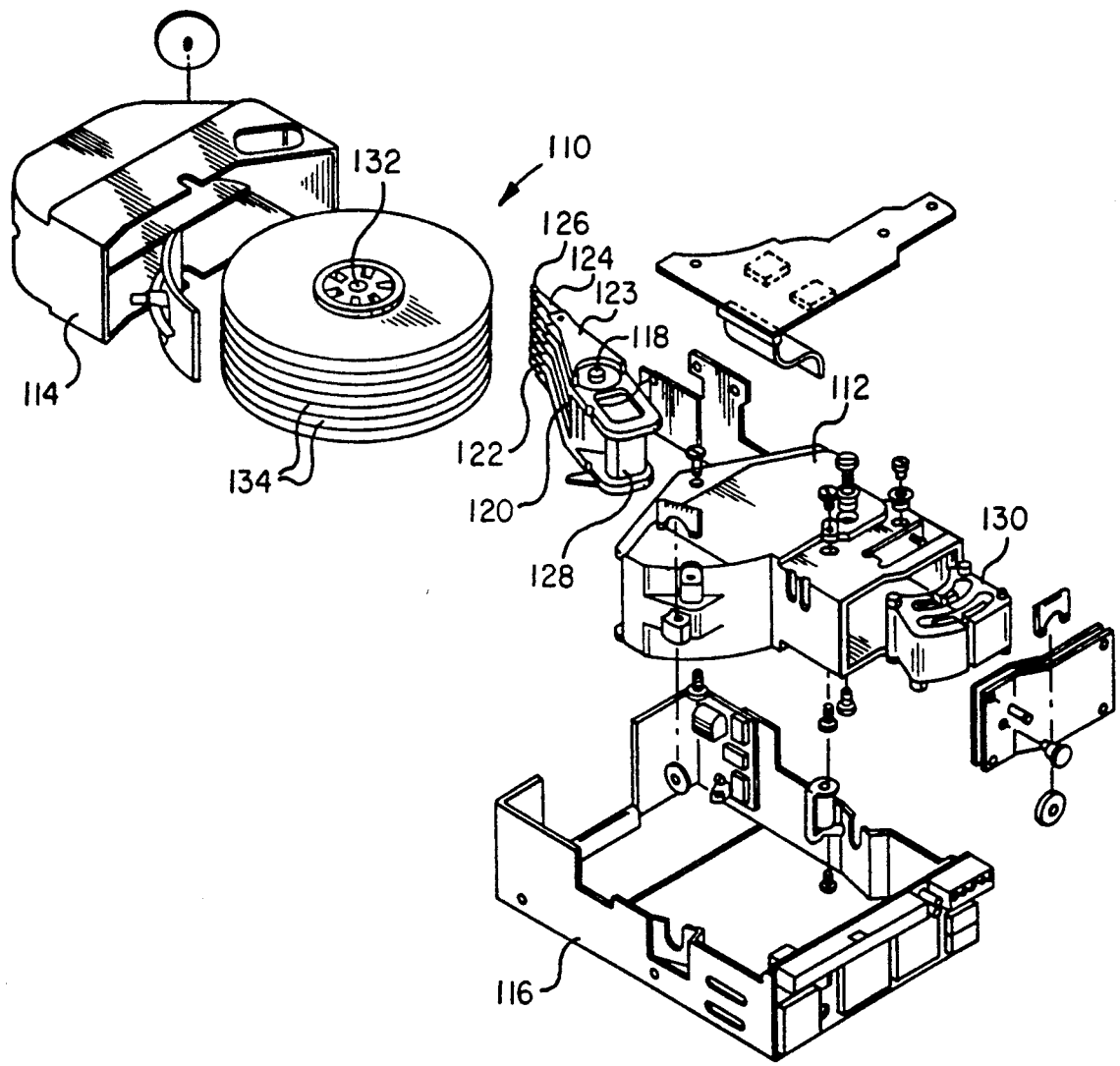
FIG. 5 is an exploded view of a disk drive in accordance with the present invention.

The invention described in this application is useful with all mechanical configurations of disk drives or direct access storage devices ("DASD"). FIG. 5 is an exploded view of a disk drive 110. It should be noted that although a rotary actuator is shown the invention described herein is applicable to linear actuators. The disk drive 110 includes a housing 112, and a housing cover 114 which, after assembly, is mounted within a frame 116. Rotatably attached within the housing 112 on an actuator shaft 118 is an actuator arm assembly 120. One end of the actuator arm assembly 120 includes an E block or comb like structure 122 having a plurality of arms 123. Attached to the separate arms 123 on the comb or E block 122, are load springs 124. Attached at the end of each load spring is a slider 126 which carries a pair of magnetic transducers. On the other end of the actuator arm assembly 120 opposite the load springs 124 and the sliders 126 is a voice coil 128.

Attached within the housing 112 is a pair of magnets 130. The pair of magnets 130 and the voice coil 128 are key parts of a voice coil motor which applies a force to the actuator assembly 120 to rotate it about the actuator shaft 118. Also mounted within the housing 112 is a spindle shaft 132. Rotatably attached to the spindle shaft 132 are a number of disks 134. In FIG. 1, eight disks are attached to the spindle shaft 132. As shown in FIG. 1, the disks 134 are attached to the spindle shaft 132 in spaced apart relation. An internal motor (not shown) rotates the disks 134.

In operation, a plurality of disks 12 are placed around circular hub 14 each being separated by annular spacer 16. Top disk 10 is then placed around circular hub 14. A collapsing force 26 is applied to annular clamp 18 at indentations 24 causing tabs 20 to be displaced outwardly. Annular clamp 18 is then placed over circular hub 14 until tabs 30 contact top disk 10. Axial force 28 is applied to tabs 20. Collapsing force 26 is released causing tabs 20 to collapse radially underneath lip 36. Axial force 28 is released permitting lip 36 to restrain tabs 20.

While the invention has been particularly shown and described with reference to a preferred embodiment, it will be understood by those skilled in the art that various changes in form and detail may be made therein without departing from the spirit and scope of the invention.

We claim:

1. A system for efficiently clamping a plurality of disks in a spaced parallel relationship around a circular hub having a selected diameter, said system comprising:
   a plurality of annular spacers, each having an aperture larger than said selected diameter, disposed around said circular hub between adjacent ones of said plurality of disks;
   an annular clamp having a plurality of tabs extending inwardly into an aperture formed therein, said plurality of tabs defining an aperture slightly smaller than said selected diameter and displacing outwardly in response to a collapsing force applied to said annular clamp; and,
   a lip within the circumference of said circular hub adapted to receive said plurality of tabs in response to a release of said collapsing force wherein axial movement of said annular clamp thereafter is restrained.

2. The system according to claim 1, further comprising a second plurality of tabs disposed upon one surface of said annular clamp for applying axial clamping to a selected one of said plurality of disks.

3. The system according to claim 2, wherein said second plurality of tabs includes three tabs.

4. The system according to claim 1, wherein said annular clamp includes an outer edge having a plurality of circumferentially spaced indentations for receiving said collapsing force.

5. The system according to claim 1, further comprising a plurality of pads disposed upon opposite surfaces of each of said plurality of annular spacers for applying axial clamping to adjacent ones of said plurality of disks.

6. The system according to claim 5, wherein said plurality of pads comprises three pads on each surface.

7. The system according to claim 1, wherein each of said plurality of annular spacers includes an outer edge having a plurality of circumferentially spaced indentations for aligning said plurality of annular spacers around said circular hub.

8. A disk drive for storing data comprising:
   a housing;
   a hub having a selected diameter and rotatably attached to said housing;
   a plurality of disks clamped to said hub in spaced apart relation;
   a clamping mechanism for clamping said plurality of disks to said hub further comprising:
      a plurality of annular spacers, each having an aperture larger than said selected diameter, disposed around said circular hub between adjacent ones of said plurality of disks;
      an annular clamp having a plurality of tabs extending inwardly into an aperture formed therein, said plurality of tabs defining an aperture slightly smaller than said selected diameter and displacing outwardly in response to a collapsing force applied to said annular clamp; and a lip within the circumference of said circular hub adapted to receive said plurality of tabs in response to a release of said collapsing force wherein axial movement of said annular clamp thereafter is restrained.

9. The disk drive according to claim 8, further comprising a second plurality of tabs disposed upon one surface of said annular clamp for applying axial clamping to a selected one of said plurality of disks.

10. The disk drive according to claim 9, wherein said second plurality of tabs includes three tabs.

11. The disk drive according to claim 8, wherein said annular clamp includes an outer edge having a plurality of circumferentially spaced indentations for receiving said collapsing force.

12. The disk drive according to claim 8, further comprising a plurality of pads disposed upon opposite surfaces of each of said plurality of annular spacers for applying axial clamping to adjacent ones of said plurality of disks.

13. The disk drive according to claim 12, wherein said plurality of pads comprises three pads on each surface.

14. The disk drive according to claim 8, wherein each of said plurality of annular spacers includes an outer edge having a plurality of circumferentially spaced indentations for aligning said plurality of annular spacers around said circular hub.

* * * * *